United States Patent [19]
Gasper et al.

[11] Patent Number: 5,752,152
[45] Date of Patent: May 12, 1998

[54] COPY RESTRICTIVE SYSTEM

[75] Inventors: John Gasper, Hilton; Jay Stuart Schildkraut, Rochester, both of N.Y.

[73] Assignee: Eastman Kodak Company, Rochester, N.Y.

[21] Appl. No.: 598,778

[22] Filed: Feb. 8, 1996

[51] Int. Cl.$^6$ ............................................. G03G 21/00
[52] U.S. Cl. ............................................. 399/366; 283/902
[58] Field of Search ........................... 399/366; 283/902; 355/133; 380/51

[56] References Cited

U.S. PATENT DOCUMENTS

| | | | |
|---|---|---|---|
| 3,852,088 | 12/1974 | Godlewski et al. | 355/133 X |
| 4,351,547 | 9/1982 | Brooks | 283/902 X |
| 4,988,126 | 1/1991 | Heckenkamp et al. | 283/902 X |
| 5,018,767 | 5/1991 | Wicker | 283/67 |
| 5,193,853 | 3/1993 | Wicker | 283/85 |
| 5,216,724 | 6/1993 | Suzuki et al. | 399/130 |
| 5,231,663 | 7/1993 | Earl et al. | 380/18 |
| 5,257,119 | 10/1993 | Funada et al. | 358/438 |
| 5,286,286 | 2/1994 | Winnik et al. | 106/21 |
| 5,291,243 | 3/1994 | Heckman et al. | 355/201 |
| 5,338,067 | 8/1994 | Gundjian | 283/902 X |
| 5,375,886 | 12/1994 | Tsuchiya | 283/93 |
| 5,379,093 | 1/1995 | Hashimoto et al. | 355/201 |
| 5,385,803 | 1/1995 | Duff et al. | 430/138 |
| 5,390,003 | 2/1995 | Yamaguchi et al. | 355/201 |
| 5,396,559 | 3/1995 | McGrew | 380/54 |
| 5,412,718 | 5/1995 | Narasimhalu et al. | 380/4 |
| 5,418,602 | 5/1995 | Nishikawa | 355/201 |
| 5,444,779 | 8/1995 | Daniele | 380/3 |
| 5,621,503 | 4/1997 | Komaki et al. | 399/366 |

FOREIGN PATENT DOCUMENTS

| | | |
|---|---|---|
| 688127A | 12/1995 | European Pat. Off. . |
| 4426126 | 1/1995 | Germany . |
| 01 065548 | 6/1989 | Japan . |
| 2277223 | 10/1994 | United Kingdom . |

OTHER PUBLICATIONS

Nature, p. 119, vol. 156, 1945.
Research Disclosure No. 365, Sep. 1994.

*Primary Examiner*—Fred L. Braun
*Attorney, Agent, or Firm*—Edward Dugas

[57] ABSTRACT

A system and associated method for restricting the copying of an image document that contains an image of arbitrary and undetermined character that is formed in or on a document medium having a predetermined pattern of microdots. One embodiment of the system includes a copy machine and associated software that scans for the presence of microdots in an image document and if present prevents the copy machine from making a copy. The microdots are of such a size that they are not visible to the unaided eye, but when machine scanned their presence is sensed.

35 Claims, 5 Drawing Sheets

Microfiche Appendix Included
(1 Microfiche, 14 Pages)

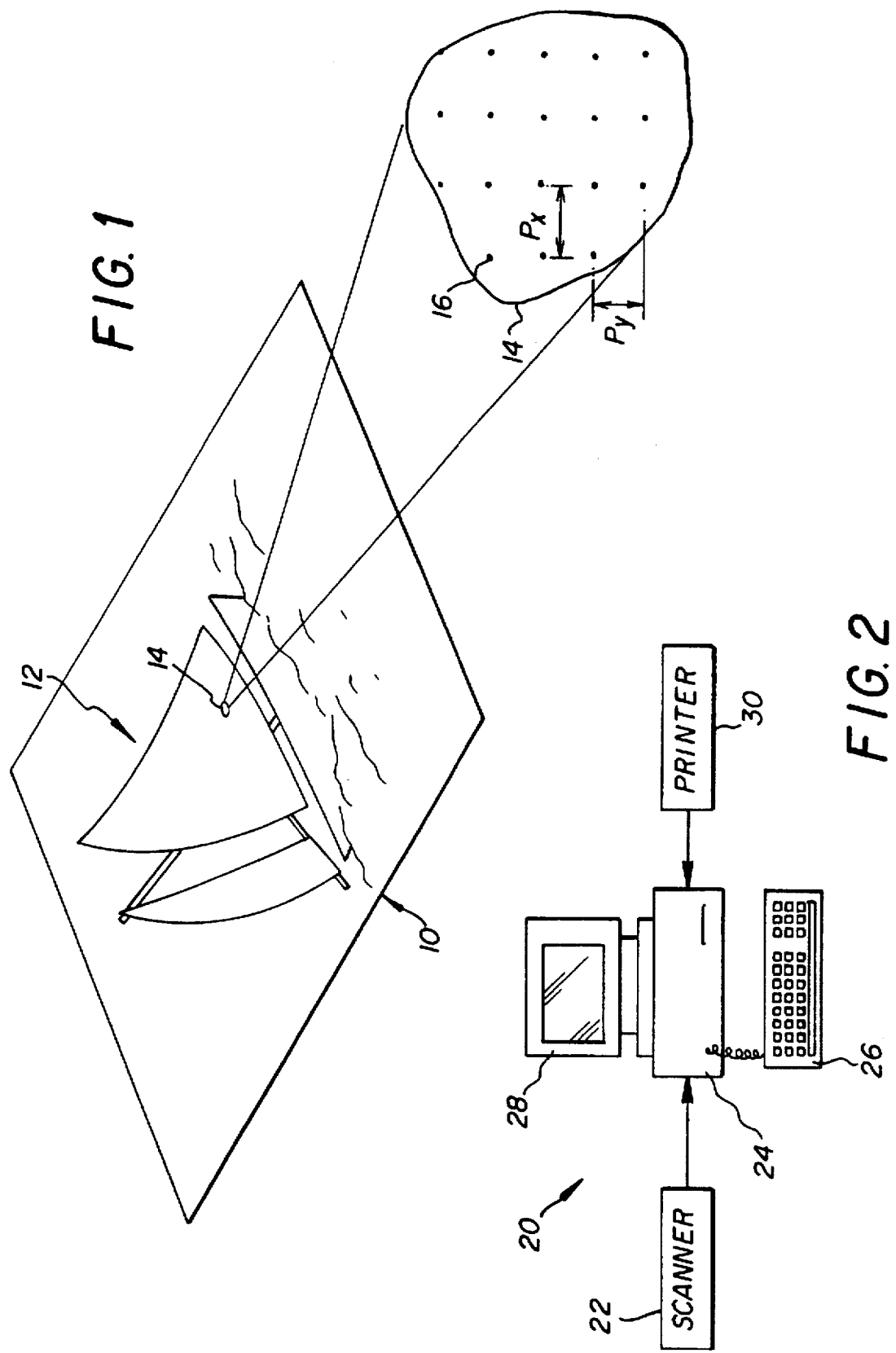

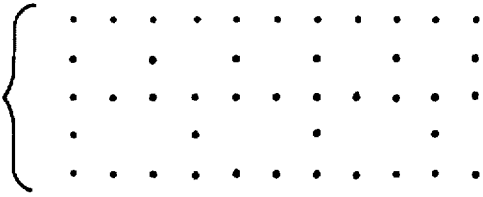
FIG. 5A  SIGNATURE 1
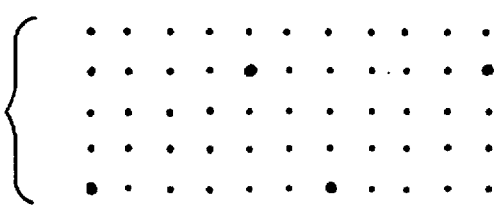
FIG. 5B  SIGNATURE 2
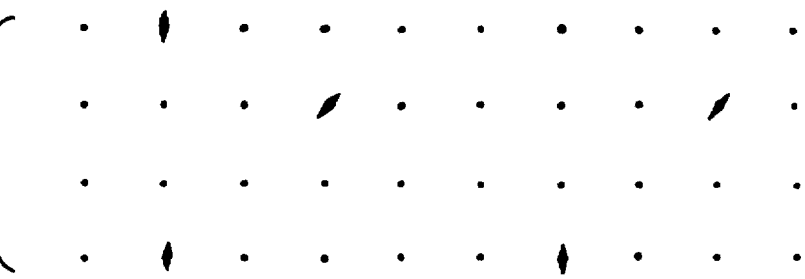
FIG. 5C  SIGNATURE 3
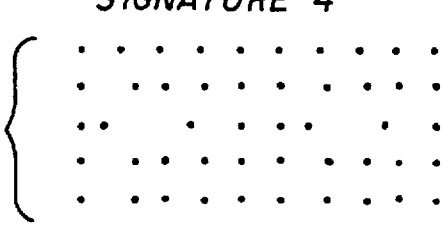
FIG. 5D  SIGNATURE 4

1
COPY RESTRICTIVE SYSTEM

CROSS-REFERENCE TO RELATED APPLICATIKONS

The present application is related to U.S. application Ser. No. 60/004,404, filed Sep. 28, 1995, by Jay S. Schildkraut, et al., and entitled, "Copy Protection System"; U.S. application Ser. No. 08/598,785, filed Feb. 08, 1996, by John Gasper, et al., and entitled, "Copy Restrictive Documents"; U.S. application Ser. No. 08/598,446, filed Feb. 08, 1996, by Xin Wen, and entitled, "Copyright Protection In Color Thermal Prints." The last two applications were filed on even date with the present application.

MICROFICHE APPENDIX

The disclosure in the microfiche appendix of this patent document, consisting of 1 microfiche and 14 pages contains material to which a claim of copyright restriction is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The invention relates generally to the field of copy restriction, and in particular to a technique for controlling or restricting the copying of copyrighted aterial.

BACKGROUND OF THE INVENTION

Copying of documents has been performed since the first recording of information in document form. Documents are produced using many procedures on many types of substrates and incorporate many forms of information. Unauthorized copying of documents has also been occurring since the storage of information in document form first began. For much of the history of information documentation, the procedures used to copy original documents have been sufficiently cumbersome and costly to provide a significant impediment to unauthorized copying, thus limiting unauthorized copying to original documents of high value (e.g. currency, etc.). However, in more recent times the introduction of new technologies for generating reproductions of original documents (e.g. electrophotography, etc.) has decreased the cost and inconvenience of copying documents, thus increasing the need for an effective method of inhibiting unauthorized copying of a broader range of restricted documents. The inability of convenient, low-cost copying technologies to copy original documents containing color or continuous tone pictorial information restricted unauthorized copying primarily to black-and-white documents containing textual information and line art. Recently, the introduction of cost effective document scanning and digital methods of signal processing and document reproduction have extended the ability to produce low cost copies of original documents to documents containing color and high quality pictorial information. It is now possible to produce essentially indistinguishable copies of any type of document quickly, conveniently, and cost effectively. Accordingly, the problem of unauthorized copying of original documents has been extended from simple black-and-white text to color documents, documents containing pictorial images, and photographic images. In particular, restricting the unauthorized duplication of photographic images produced by professional photographers on digital copying devices has recently become of great interest.

U.S. Pat. Nos. 5,193,853 and 5,018,767, disclose methods to restrict the unauthorized copying of original documents on devices utilizing opto-electronic scanning by incorporating spatially regular lines into the original document. The spacings of the lineations incorporated in the original document are carefully selected to produce Moiré patterns of low spatial frequency in the reproduced document allowing it to be easily distinguished from the original and degrading the usefulness of the reproduction. Although the Moiré patterns produced in the reproduced document are readily apparent to an observer, the required line pattern incorporated in the original document to produce the Moiré pattern upon copying is also apparent to an observer under normal conditions of use. Additionally, production of the Moiré pattern in the reproduced document requires that specific scanning pitches be employed by the copying device. Accordingly, this method of restricting unauthorized document copying is applicable only to documents such as currency or identification cards where the required line pattern can be incorporated without decreasing the usefulness of the document; application of this technique to high quality documents is unacceptable due to the degradation of quality and usefulness of the original document.

U.S. Pat. No. 5,444,779, discloses a method of restricting a document from unauthorized copying by the printing of a two-dimensional encoded symbol in the original document. Upon scanning of the original document in an initial step of a copying process, the encoded symbol is detected in the digital representation of the original document and the copying process is either inhibited or allowed following billing of associated royalty fees. U.S. patent application Ser. No. 60/004,404, filed Sep. 28, 1995, by Schildkraut et al., and entitled, "Copy Protection System," discloses the incorporation of a symbol of a defined shape and color into a document followed by detection of the symbol in a scanned representation of the document produced by the copying device. In both disclosures, the incorporated symbol is detectable by an observer under normal conditions of use and readily defeated by cropping the symbol from the original document prior to copying. In addition, incorporation of the symbol into the document is required in the generation of the original document leading to undesired inconvenience and additional cost. Accordingly, these methods of imparting restriction from unauthorized copying are unacceptable.

U.S. Pat. Nos. 5,390,003, 5,379,093, and 5,231,663 disclose methods of recognizing a copy restricted document by the scanning and analysis of some portion of the original document and comparison of the signal obtained with the signals stored in the copying device. When the signal of a copy restricted document is recognized, the copying process is inhibited. This method of restricting from the unauthorized copying of documents is limited in application because the signals of all documents to be copy restricted must be stored in or accessible by each copying device of interest. Because the number of potential documents to be copy restricted is extremely large and always increasing, it is impractical to maintain an updated signal database in the copying devices of interest.

Methods of encrypting a digital signal into a document produced by digital means have been disclosed. These methods introduce a signal which can be detected in a copying system utilizing document scanning and signal processing. These methods offer the advantage of not being detectable by an observer under normal conditions of use, thus maintaining the usefulness of high quality copy restricted documents. However, implementation of these methods is dependent on digital production of original documents. Although increasing, production of high quality documents using digital means is still limited. Accordingly, this approach is not useful for restricting the unauthorized copying of high quality documents produced using non-digital production methods.

Finally, U.S. Pat. 5,412,718 discloses the use of a key associated with the physical properties of the document substrate which is required to decode the encrypted document. This method of restricting the unauthorized copying of documents is unacceptable for applications of interest to the present invention because it requires encryption of the original document rendering it useless prior to decoding.

SUMMARY OF THE INVENTION

The present invention is directed to overcoming one or more of the problems set forth above. Briefly summarized, according to one aspect of the present invention, there is provided a system for restricting the copying of an image document comprising:

- an image of arbitrary and undetermined character formed in or on a document medium having a predetermikned pattern of microdots creating an image document of arbitrary and undetermined character;
- detecting means for detecting the presence of one or more microdots in said document; and
- controlling means responsive to said detecting means for restricting a copy machine from copying the image document when a microdot is detected.

The primary object of the present invention is to provide documents with copy restriction that can be implemented without degrading the quality of the original.

Another object of the present invention is to provide a method of copy restriction that does not require the production of the original document using digital techniques.

Yet another object of the present invention is to provide a copy restriction method that incorporates a plurality of prescribed microdots in the document to be restricted that are not visible under normal viewing conditions.

A further object of the present invention is the prevention of the copying of currency.

Still another object of the present invention is the encryption or encoding of signatures into the plurality of prescribed microdots for assigning document ownership.

Another object of the present invention is the printing of the back of photographic prints with microdots.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

This technique of copy restriction has several positive features. The microdot pattern incorporated into the original document is not detectable by the user under routine conditions of document viewing allowing it to be used in high quality documents for most applications without any detectable degradation in usefulness. The microdot pattern can be employed throughout the document increasing the robustness of detection while simultaneously making it impossible to crop out of the document. Additionally, because the pattern is substantially invisible, authorized copying of the original document results in reproductions of high quality and utility. Implementation of the inventive method of copy restriction represents a low-cost solution to manufacturers of copying devices incorporating opto-electronic scanning devices and digital signal processing since no new equipment is required. The ability to incorporate the microdot pattern into the document medium during medium manufacturing makes it simple and cost effective for the producer of the original document to implement. And finally, coloring the edge or edges of the document media enables visual and/or machine readable identification of the copy restrictive media.

BRIEF DESCRIPTION OF THE DRAWINGS

FIG. 1 is a perspective of a print incorporating the microdots of the present invention with an enlarged projection of a portion of the print to visually present the microdots;

FIG. 2 illustrates in block diagram form a system on which the present method may be incorporated;

FIGS. 5A through 5D depict representative signatures encoded into arrays of microdots;

To facilitate understanding, identical reference numerals have been used, where possible, to designate identical elements that are common to the figures.

DETAILED DESCRIPTION OF THE INVENTION

Figure 3:
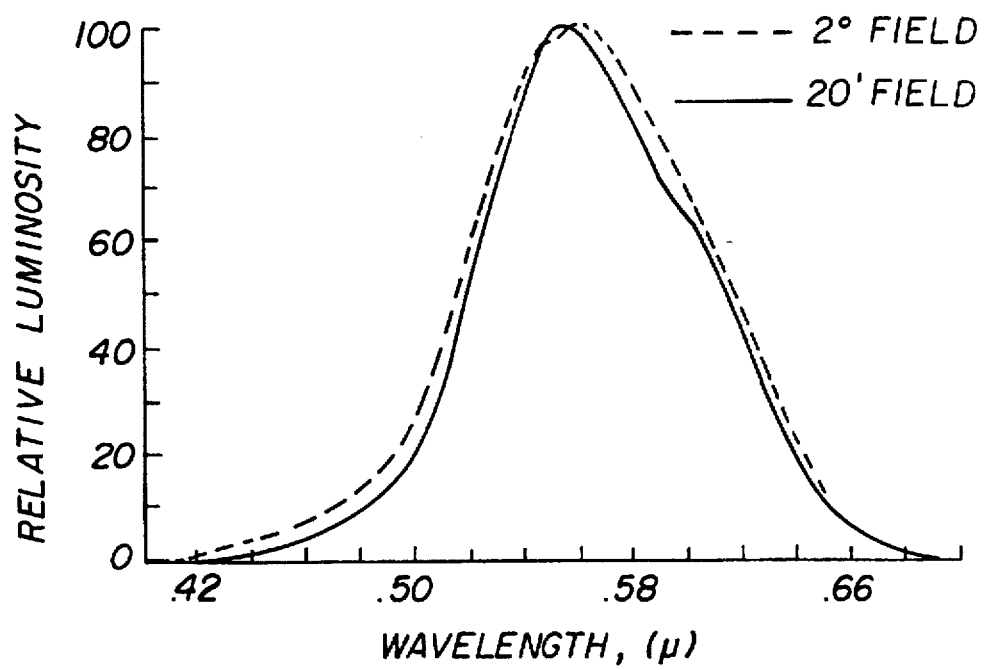
FIG. 3 is a graph illustrating the photopic luminosity functions of the human eye for two fields of centrally fixated viewing.

Referring to FIG. 1, in its most general implementation, the inventive method to impart copyright restriction to hard copy information-bearing documents incorporates a pattern of microdots 16 into an image 12 on an original document 10. The pattern is enlarged for the reader's ease of viewing in window 14, but normally is not easily detectable by visual examination of the image 12.

FIG. 2 is a sketch of a typical copy print station 20. In a classical copy situation the original document 10 is placed on a scanner 22 to provide a digitized sequence of signals to a computer 24. The computer 24 utilizes a keyboard 26, mouse, or touch screen for operator interaction with the computer 24 and a monitor 28 for viewing the scanned image. A printer 30 is attached to the computer 24 directly or via a communication link to enable the formation of hard copy prints. An algorithm, residing in computer 24, detects the presence of any pattern of microdots 16 in the original document 10, and automatically deactivates the printer 30 to abort the document copying process thereby restricting the unauthorized copying of the original document 10.

For the purpose of this disclosure, "hard copy, information bearing documents" (henceforth referred to as "documents") is meant to refer to any type of sheet media bearing, or capable of bearing, any type of visible information. The "sheet media" may be any reflective medium (e.g. paper, opaque plastic, canvas, etc.), or alternatively may be any transparent or translucent medium (e.g. photographic film, etc.). In this disclosure, "information" is meant to refer to any form of information that is visible to an observer. Typical information is either pictorial or graphical in form including, but not limited to, text, sketches, graphs, computer graphics, pictorial images, paintings, and other forms of two-dimensional art. "Original" in this disclosure is meant to refer to the document that is scanned in an initial step of the copying process. "Copy" means a reproduction, likeness, duplication, imitation, semblance that may be magnified or demagnified, in whole or in part, in the form of a print, display, digital image file, depiction, or representation. "Scanning" is meant to refer to any opto-electronic means of measuring the absorptance (by means of reflection or transmission optical density or the reflectance or transmittance) as a function of distance in the original document, and converting the measured signals into corresponding electronic signals.

Copy "restriction" means prevention of copying by mechanical, electrical, optical, or other means including the degradation of the usefulness of any copied image as well as controlled enabling of document reproduction with proper authorization.

The microdot pattern, in one embodiment of the invention, is incorporated throughout the original document to be restricted from unauthorized copying. Microdot placement at all locations within the document ensures that the pattern will exist in at least one important area of the original document making it impossible to remove the pattern by physical cropping without significantly decreasing the usefulness of the reproduced document. In another form of the invention the microdot pattern is incorporated into the original document in a pre-selected location or locations not covering the entire document.

In the practice of the invention, the incorporated microdots can take any of a variety of forms as long as they satisfy the requirements of being substantially undetected by casual observation under normal conditions of document use and do not decrease the usefulness of the original document. "Casual observation" is meant to refer to observation of the document under conditions relevant to the normal use of the document including the conditions of viewing and illumination. In particular, viewing distances will conform to those for typical utilization of the original document without the use of special image modifying devices (e.g. magnifying optics, colored filters, etc.), and illumination will conform to typical levels of illumination using illumination sources of typical color temperature. "Detection by casual observation" is taken to mean discrimination of the individual microdots of the incorporated microdot pattern or a perceived change in the optical density, either neutral or colored, of the document.

The invention is implemented using microdots of any regular or irregular shape. In the case of noncircular microdots, the orientation of the microdots can be selected to lie along any angle between 0 and 360 degrees relative to the horizontal axis of the information bearing document as normally viewed. In one embodiment of the invention, the microdots are square in shape. In another embodiment, the microdots are circular in shape.

In practicing the invention the size of the microdots is chosen to be smaller than the maximum size at which individual microdots are perceived sufficiently to decrease the usefulness of the document when viewed under normal conditions of usage. The minimum size of individual microdots is chosen to be greater than or equal to the size at which the microdot pattern can be reasonably detected by the document scanning device of interest. A useful measure of the size of the microdots is to specify the area of an individual microdot as the diameter of a microdot having a circular shape of equivalent area (henceforth referred to as the equivalent circular diameter, ECD). In situations where the edge of a microdot is not sharply defined, the edge is taken to be the isodensity profile at which the density is half the maximum density. In the preferred embodiment of the invention, microdots of an ECD of less than or equal to 300 microns are utilized. The ECD of the microdots preferably is greater than or equal to 10 microns, and most preferably greater than or equal to 50 microns.

One embodiment of the invention incorporates the microdots in a periodic pattern, although it is contemplated that the invention can be practiced with microdots aperiodically dispersed in the document. Periodic patterns of microdots, useful in the practice of the invention, can take on any periodic spatial arrangement. One embodiment of the invention places the microdots in a rectangular array. Another embodiment of the invention places the microdots in a hexagonal array. The center-to-center (defined as the distance between the centroids of two adjacent microdots) spacing of the microdots is chosen to be any distance greater than or equal to the minimum distance at which an increase in document density occurs which is observed by casual observation to decrease the usefulness of the original document. In one form of the invention, the spacing of the microdots is greater than or equal to 1.0 mm. The robustness of microdot detection in a document representative digital signal increases with an increase in the number of microdots present in the document. Although it is possible to practice the invention with any microdot spacing which exceeds the minimum spacing for the detection of an unwanted increase in density, a preferred version of the invention incorporates microdots with a spacing similar to the minimum allowable spacing as described above. Another method of practicing the invention utilizes a microdot pattern in which the center-to-center spacing of the microdots is less than 10 mm.

Microdots useful in the practice of the invention can be of any brightness, hue, and saturation which does not lead to sufficient detection by casual observation to reduce the usefulness of the original document. To minimize the detectability of individual microdots, it is preferable to select the hue of the microdots to be from the range of hues that are least readily resolvable by the human visual system. It is also preferable to select the hue of the microdots under conditions of maximum visual contrast to their surround. When incorporated into photographic prints with images typical of professional photographers, it has been found that the areas of most critical interest to the photographer for observing the presence of microdots are the highlight areas of low reflection density and most critically white areas. An objective of this invention is to select the hue of the microdots from the range of hues that are least readily resolvable by the human visual system when viewed against a white or substantially white surround. The white background is also typical of documents containing text and graphics. It is understood that in any small area of the image that is colored, the apparent color of the microdots is modified by the additional absorption of the image so as to appear a different color. For example, a yellow microdot with an overlying or underlying magenta background will appear red under magnification. At the same time, the hue of the microdots useful in the practice of the invention must also be selected to conform to the sensitivities of the anticipated document scanning device to optimize detection of the microdot pattern in the document representative digital signals.

Figure 4:
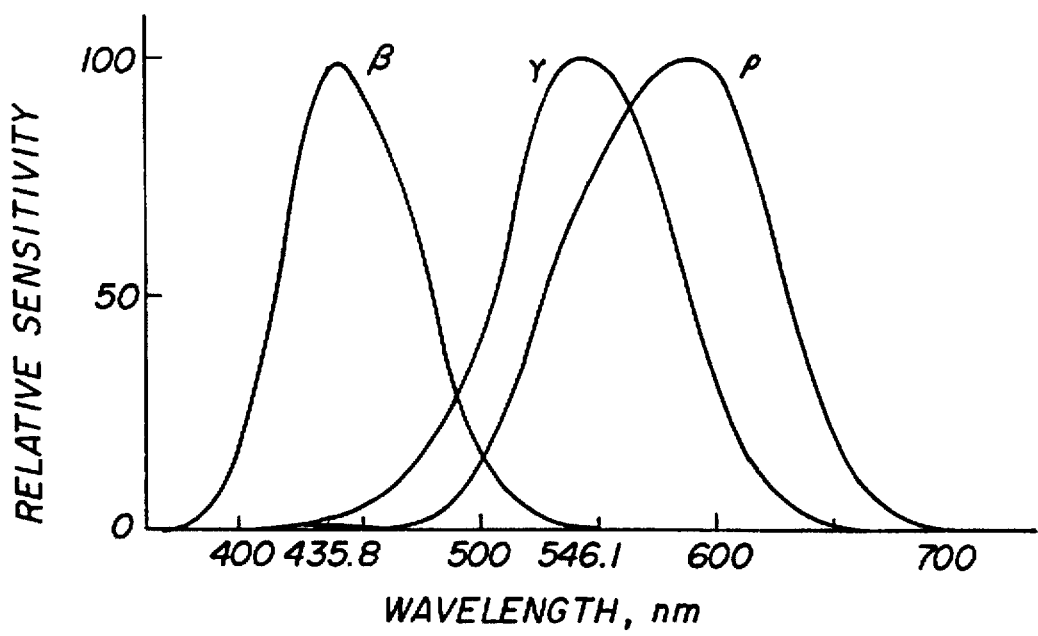
FIG. 4 is a graph illustrating trichromatic sensitivities.

FIG. 3 shows the centrally fixated luminosity response for a typical observer for two different fields of view. The field of view for microdots of dimensions useful in the practice of this invention is approximately 0.02 degrees or 1.2 arc-minutes (see for further detailed information: "NATURE," p.119, vol. 156, 1945.) It is specifically contemplated that the practice of this invention will be useful in the restriction of unauthorized copying of documents on copying devices designed to produce reproductions of the original document that are visually indistinguishable from the original as seen by an observer. The sensitivity of devices of this type is typically chosen to closely approximate the sensitivities of the human visual system as shown in FIG. 4. Accordingly, the most preferred embodiment of the invention will incorporate microdots that are substantially yellow in hue. Selection of yellow hues will simultaneously satisfy the requirements of being least sensitive to detection by an observer, but readily detectable by a copying device. Accordingly, the most preferred method of practicing this invention is to select the hue of the microdots such that their spectral absorptions fall substantially in the wavelength region less than 500 nm. In yet another method of practicing the invention the hue of the microdots is chosen such that their spectral absorptions fall substantially in the wavelength region greater than 640 nm. Substantially as used in this disclosure is taken to mean that at least 75% of the integrated area under a plot of spectral absorption versus wavelength between the limits of 400 nm and 700 nm falls within the specified region. The spectral absorption of light by the yellow microdots is sufficient to allow detection by the document copier, but is insufficient to render the microdots perceptible. For systems in which the opto-electronic scanning device has spectral sensitivities which depart from the normal sensitivities of the human visual sensitivities, the hue of the microdots is preferably shifted in a similar manner.

It is possible and desirable to practice the invention by incorporating microdots of different repetitive patterns as a means of providing a unique signature to a document. The term "signature" here is defined as any uniquely defined pattern that distinguishes or identifies one document from all others.

Figure 6:
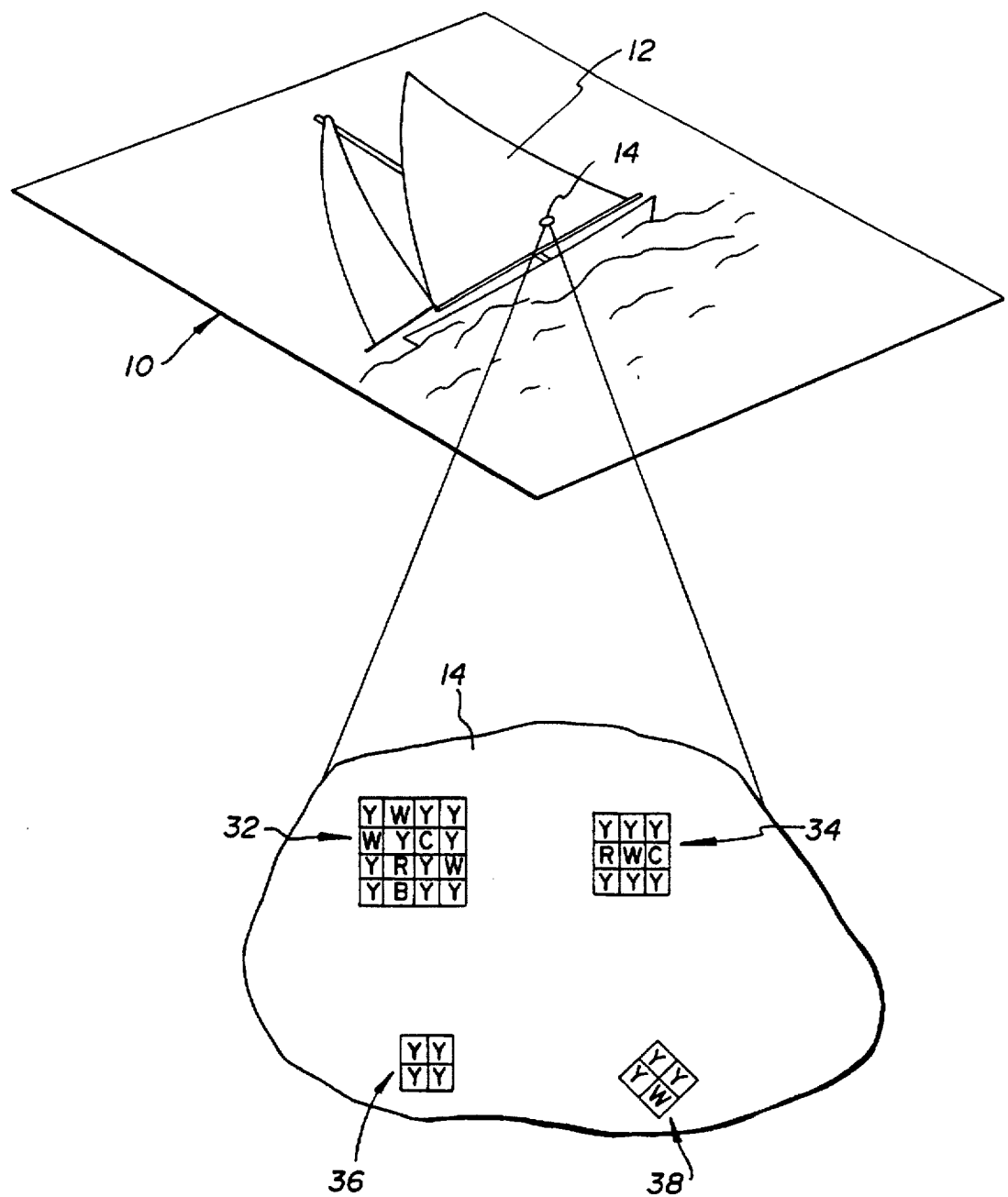
FIG. 6 depicts representative signatures encoded into the arrays composing the microdots (Y=yellow, M=magenta, C=cyan, R=red, B=blue, and W=white)

Examples of four patterns constituting signatures are shown in FIGS. 5A through 5D. It is also contemplated that the invention may be usefully practiced by incorporating more than one microdot pattern in an original document. Patterns can differ in any of their physical characteristics such as microdot color (including less than 20% of the microdots of a color other than yellow), spectral absorptance, shape, profile, orientation, spacing, geometry of the microdot array, and microdot size. Additionally, individual microdots can be encoded with signatures contained within the microdots as shown in FIG. 6. Although the predominant color is yellow, the encoded microdots (32 through 38) have been subdivided into contiguous domains of different colors, such as magenta (M), cyan (C), red (R), green (G), blue (B), and white (W). Various configurations are shown at 32, 34, and 38. Yellow is the predominant color when occupying 50% or more of the area of each microdot. It is only necessary for other colors and white to occupy 50% and preferably less than 30% of the area so the color matrix of each microdot can be different from its neighbors and the microdots can also differ in color, spectral absorptance, shape, profile, orientation, spacing, geometry, and size to provide an almost unlimited number of unique signatures.

A preferred practice of the invention incorporates the microdot pattern into the original document to be restricted by producing the original document using a medium that contains the microdot pattern. In another preferred method of practicing the invention, the microdot pattern is added to the produced original document prior to distribution. In an alternative form of the invention, the microdot pattern can be incorporated into the document information prior to recording the document information onto the medium.

Incorporation of the microdot pattern into the original document medium prior to production of the original document can be accomplished using a number of printing technologies such as gravure printing, lithographic printing, letterpress printing, inkjet printing, electrophotographic printing, thermal printing, laser printing, or impact printing. Printing processes are preferably operated in a web configuration, but sheet fed printing is also contemplated. The medium of choice is passed through a printing device which adds the microdot pattern utilizing one of the printing technologies described above. The original document is then produced on the medium containing the microdot pattern utilizing any applicable information recording technology resulting in an original document which can be restricted from unauthorized reproduction according to the invention.

In one alternative form of practicing the invention the microdot pattern is added to the original document following production of the original document.

Any printing technology capable of printing onto the original document to be restricted, as described above, can be used in the practice of the invention to add the microdot pattern to the image-bearing document. One method useful for adding the microdot pattern to a document is to use a laminant overlay incorporating the desired pattern. The use of laminants containing patterns has been described in copending application Ser. No. 08/598,785, entitled, "Copy Restrictive Documents," by John Gasper, et al., and filed on even date herewith.

Materials useful in forming the microdots include all colorants commonly referred to as dyes, solid particle dyes, dispersions, pigments, inks, toners, etc.

These colorants may be transparent, translucent, or opaque and may modulate light by any means including absorption, reflection, refraction, scattering, or emission of light. When the invention is practiced using a medium which is observed by reflected light and the microdot pattern is located between the document medium and the document image-forming material, any of the colorants previously listed are useful. When the invention is practiced using a medium which is observed by transmitted light, the preferred forms of colorants include those which are substantially transparent. When the invention is practiced by adding the microdot pattern over the image-forming or image-bearing document, the preferred forms of the colorants include those which are substantially transparent.

It is specifically anticipated that the practice of the invention is particularly useful in restricting photographic images from unrestricted copying on copying devices utilizing opto-electronic scanning devices. As described above, the microdot pattern can be incorporated into the photographic medium prior to production of the photographic image, following production of the photographic image, or incorporated into a digital image prior to printing using a digital printing technology. In one method of practicing the invention on photographic images, the microdot pattern is incorporated into the photographic medium prior to production of the photographic image, preferably during manufacturing. Reflective and transmissive photographic supports, substrates, or bases are contemplated in the practice of the invention. The preferred method of incorporating the microdot pattern into a photographic medium is to print the microdot pattern onto the photographic support using any of the printing technologies described previously prior to coating of the light-sensitive materials onto the preprinted photographic support.

It is specifically contemplated that both color and black-and-white image-forming photographic media are useful in the practice of the invention. Accordingly, photographic media contemplated in the practice of the invention will contain at least one silver halide light-sensitive unit sensitive to at least one region of the ultraviolet, visible and/or infrared spectrum. It is common to have silver halide light-sensitive units contain more than one silver halide containing layer sensitive to the same region of the ultraviolet, visible and/or infrared spectrum. Color recording photographic media typically contain three silver halide light-sensitive units each recording light from one of the red, green, and blue regions of the spectrum. The silver halide light-sensitive layers may or may not contain color forming precursors. The order of the silver halide containing light-sensitive layers may take on any of the forms known to one skilled in the art of silver halide media design. Technologies relevant to the design and production of photographic media can be found in Research Disclosure Number 365, Sep. 1994, herein incorporated by reference.

When the invention is practiced using a photographic support of the reflective type, the microdots are printed on the image bearing side of the reflective support prior to addition of the light-sensitive layers. In the preferred photographic media embodiment of the invention, the printed microdots are isolated from the light-sensitive silver halide layers and subsequent photographic processing solutions by the application of a transparent protective overcoat. It is common practice to apply a polymeric resin coating to both sides of reflective photographic supports. If the polymeric resin applied to the image-bearing side of the support is transparent, it is preferred to print the microdot pattern onto the support prior to application of the polymeric layer. In cases where the polymeric layer applied to the image bearing side of the substrate contains a non-transparent material to alter the optical properties of the support (e.g. titanium dioxide, barium sulfate, etc.), it is preferred to print the microdot pattern on top of the polymeric layer after it has been applied to the photographic support. In cases where there is no protective layer separating the printed microdots from the light-sensitive silver halide containing layers and photographic processing solutions, the preferred colorants are chosen from those which do not effect the photographic response of the light-sensitive silver halide layers or are subject to chemical destruction by typical photographic processing solutions. Colorants useful in this application include, but are not limited to, preformed photographic image dyes and filter dyes incorporated in photographic media as described in Research Disclosure Number 365, Sep. 1994. Colorants are contemplated to be incorporated into any convenient binder or carrier useful in formulating printing inks or useful in formulating light-sensitive media. It is also contemplated that microdots may be printed on the back side of reflection print materials to convey information about manufacture of the product.

In an alternative form of the invention, the microdot pattern is added to the photographic medium (by a controlled exposure using a microdot pattern contact mask) prior to or following photographic recording of the image. Microdot pattern masks useful in the practice of this form of the invention can be prepared using typical photographic means. One such means photographs a black microdot pattern on a white background with high contrast lithographic film. The size and spacing of the microdot pattern to be photographed in combination with the magnification of the camera's optical system are chosen to give a photographic film image of the correct physical dimensions. Photographic processing of the lithographic film results in a final mask of clear microdots on a black background. A more preferred means of producing the microdot contact mask is to generate a digital image of the desired microdot pattern followed by the use of a digital graphic arts imagesetter to write the digital image onto lithographic film. The polarity of the igital image can be inverted in the computer so that a ingle photographic writing and processing step results n the desired microdot contact mask.

Exposure of the microdot pattern onto the hotographic medium can be usefully accomplished at any time following coating of the photosensitive materials onto the photographic support, prior to photographic processing of the photographic medium. Accordingly, it is contemplated that the microdot exposure in one form of the invention would occur during manufacturing of the photographic medium. Exposure of the microdot pattern onto the photographic medium could occur prior to or following cutting of the photographic medium into its final form. It is also contemplated in another form of the invention that the microdot pattern will be exposed onto the photographic medium immediately prior to or following exposure of the photographic medium to the photographic image to be recorded. Another arrangement of the invention exposes the microdot pattern onto the photographic medium immediately prior to photographic processing.

Photographic formation of the microdot pattern can occur in one of the image-forming layers present in the photographic medium used for forming the photographic image, or alternatively formed in a separate layer specifically designed for formation of microdots. In another arrangement of the invention the microdot pattern is formed by selective exposure of the yellow image-forming layer of the photographic medium to the microdot pattern resulting in microdots of yellow hue after photographic processing. Selective exposure is accomplished by selecting monochromatic blue light sources or by adjusting the photographic printing light source (e.g. by spectral filtration) to include only those wavelengths of light to which the yellow image-forming light-sensitive silver halide containing layers of the photographic medium are preferentially sensitive. The intensity of the microdot exposure is also adjusted such that appropriate density is formed in the yellow image-forming layer while minimizing the formation of density in the remaining image-forming layers.

When a separate microdot-forming layer is incorporated into the photographic medium, it can be located at any point between the image-bearing side of the support and the front surface of the photographic medium. In one variant of the invention, the microdot-forming layer would be located farthest from the support. In the preferred form of the invention, the microdot-forming layer would be located closest to the support.

The spectral sensitivity of a dedicated microdot-forming layer is chosen such that it does not significantly overlap with the spectral sensitivities of the remaining image-forming silver halide containing layers. A preferred embodiment of the invention utilizes a dedicated microdot-forming layer with a spectral sensitivity in the infrared region of the spectrum. The yellow hue formed by photographic processing may have a spectral absorption different from that formed in the blue-sensitive record.

Methods of exposing the microdot pattern onto the photographic medium include contact or projection printers, scanning printers such as CRTs and laser printing devices, and arrays of illumination sources including laser and light-emitting diodes.

For documents produced using digital means the microdot pattern is incorporated into the digital representation of the document prior to production of the original document. In this implementation, picture elements (pixels) of the digital representation of the document corresponding to the location of the desired microdot pattern are adjusted in value to produce microdots having the desired absorptance in the produced original document. Application of this approach is specifically contemplated for color documents. The value of pixels corresponding to the microdot pattern are adjusted to produce a maximum amount of blue density (yellow dye formation) while the amounts of red and green density formed remain unchanged from the digital representation of the document. The encoding of a signature into the digitally written document can be accomplished by incorporating deterministic signals with well-defined spatial patterns and sequences of microdot size, shape, orientation, and color in a repetitive fashion as well as signatures within the arrays of contiguous pixels forming the microdots. The original document containing the microdot pattern is scanned with an opto-electronic scanning device associated with a copying device. The opto-electronic scanning device can be the same scanning device used for copying the original document or alternatively one may utilize a scanning device intended solely for analysis of the original document to be copied. Another embodiment of the invention utilizes an opto-electronic scanning device and digital image processing unit to detect the presence of the microdot pattern. The detecting unit controls the operation of a copying device which in general does not rely on opto-electronic scanning techniques to produce a reproduction of the original document. Practice of the invention with a digital copying system, incorporating an opto-electronic scanning device, utilizes a sub-sampled set of data obtained from the scanning of the original copy restrictive document to detect any present microdots.

Alternately a digital copying system may pre-scan the original document at a relatively low resolution for the purpose of previewing the original document and quickly detecting the presence of any microdot pattern. If a microdot pattern is not detected, a second scan at a higher resolution is performed for the purpose of document reproduction. The design of the opto-electronic scanning device is selected from any of the designs known to those skilled in the art of scanner design. A scanning device that utilizes a separate opto-electronic sensor and or illumination source conforming to the spectral properties of the microdot pattern is preferred. The resolution of the opto-electronic scanning device is chosen to distinguish the microdots from the surrounding document area. For the practice of the invention a scanning resolution equal to or greater than 75 microdots per inch (dpi) is acceptable. More preferred is a scanning resolution greater than or equal to 150 dpi, and most preferred is a scanning resolution greater than or equal to 200 dpi. A scanner of even higher resolution (1000 dpi or greater) is preferred for the detection and analysis of a repetitive signature in the document.

Scanning a document with the opto-electronic scanning device produces electronic signals representing optical absorptance or optical density of the document on a pixel-by-pixel basis. The electronic signals are generally converted into a digital image prior to subsequent electronic processing to permit detection of the presence of a microdot pattern in the document.

The presence of microdots can be ascertained by an examination of the digital image in a variety of ways.

The number of microdots in the image may be counted by determining the number of regions of the digital image with code values and of a size and shape that are indicative of a microdot. Alternatively, the presence of the spatial pattern of the microdots in the digital image may be detected by means of image processing such as described in "DIGITAL IMAGE PROCESSING," 2nd Edition, William K. Pratt, Sun Microsystems, Inc., Mountain View, Calif., 1991 by John Wiley & Sons, Inc. (1991).

Prior to the analysis of the digital representation of the original document for the purpose of detecting the presence of the microdot pattern, transformation of the digital image into other metrics is preferred. One such transformation that is anticipated is to convert R, G, and B density representative signals into corresponding L* a* b* representative signals (see "THE REPRODUCTION OF COLOR IN PHOTOGRAPHY, PRINTING, AND TELEVISION," by R.W.G. Hunt, Fountain Press, 1987). Other color space transformations are also anticipated as being useful in the practice of this invention.

Detection of microdots in the digital representation of the document is conducted throughout the entire image. As previously stated the full image can be segmented into sub-sections. The average color of each sub-section may be determined and those sections having average colors which favor the presence of microdots can be preferentially evaluated. Sub-sections which are substantially blue or of high lightness are recognized as being preferred for the detection of microdots.

The apparent color of a microdot in the image can be affected by the colors of the image surrounding the microdot and by the optical characteristics of the scanning device. To facilitate detection of the microdots it is best to adjust the threshold of color expectation to the average color of the area of the document being evaluated. The color expectation for a microdot in any medium, as seen by any opto-electronic scanning device, can be determined empirically.

A Fourier transform can be performed on the section or sub-section of the digital representation of the original document after the determination of those pixels which represent microdots. The obtained two-dimensional frequency spectrum can then be evaluated at those frequencies anticipated for periodic patterns.

Direct optical detection of microdots can take the form of the measurement of the optical reflection or transmission of light by the document with a spatial resolution sufficient to resolve a microdot. Another method of direct optical detection of microdots is by the use of an optical correlator. Optical correlators are discussed in "INTRODUCTION TO FOURIER OPTICS" by Joseph W. Goodman, McGraw-Hill (1968). The copying process is allowed to continue unrestricted if the presence of the microdot pattern is not detected in the original document. If the microdot pattern indicative of a copyright restricted document is detected, a signal indicating the detection of a copyright restricted document is turned on and the copying process is halted by the controlling software of the copying device. In one implementation of the invention, after detection of the microdot pattern, the copying process is re-initialized for the next original document. In an alternate method of practicing the invention, the copying system is disabled until an authorized operator intervenes. The authorized operator may re-enable the copying process if authorization to copy is produced, or the copying device is re-initialized without producing a copy if no authorization is available.

In another embodiment of the invention yellow microdots are incorporated into nonrestricted or copy restricted documents for the purpose of providing document scaling and rotation information. A periodic pattern of yellow microdots without rotational symmetry such as a rectangular pattern can be employed with specific values of P'x and P'y (see FIG. 1). The document copier can detect the yellow microdots and determine the angle at which the document has been placed on the platen of the copier. If the angle is beyond a set limit a message may be displayed to straighten the document on the platen before making a copy. If the detected angle is below this set limit, software in the copier may be employed to remove the image rotation in the copied image. In addition, if the spacings of yellow microdots are detected to be different than P'x and P'y by a constant scaling factor, then an algorithm in the copier can determine if the image in the document on the platen has been magnified or demagnified. If the copier determines that the image has been magnified from its original size, the copier may employ an image enhancement algorithm to improve the sharpness or acutance of the copied image.

EXAMPLES

Example 1

Example one is an implementation of the invention in a photographic image. The goal is to incorporate imperceptible microdots into an image on photographic paper and then to scan the image and detect the presence of the microdots by analyzing the digitized image.

The first step is to make a mask through which photographic paper may be exposed in order to place microdots in the paper. An imagesetter is set to a resolution of 635 dpi. An 8"×10" Eastman Kodak Kodalith™ film mask is made that consists of a rectangular (almost square) periodic array of transparent square microdots of 80 micron width and height and a center-to-center spacing of about 1.68 mm. The area of the mask between the microdots is black.

Next, a colorpatch print is made as follows: An image that consisted of 512 color patches in color-negative film was printed to Eastman Kodak Professional Portra IIETM color photographic paper with a Berkey Omega™ D5500 color enlarger with a Chromega D Dichroic II Lamphouse™. A Rodenstock™ enlarger lens of 105 mm focal length was used at a setting of f/16 and the exposure time was 7 seconds at high intensity. The dichroic settings were 69.5 yellow, 64.5 magenta, and 0.0 cyan. The negative was enlarged 2.57X when printed to a size of 8"×10". The paper was then contact exposed with blue light through the KodalithTM mask. The mask exposure was done on a second Berkey Omega D5500 Color Enlarger™ used as a point light source. This enlarger had a 50 mm Radon™ lens set at f/8 with the dichroics set at maximum filtration of green and red light (0 yellow, 171 magenta, and 171 cyan). The distance from the open negative carrier to the paper plane was 86.4 cm. The emulsion of the KodalithTM mask was held in a spring-loaded contact printing frame in contact with the emulsion of the photographic paper at the easel of the enlarger. The exposure time was 7 seconds at low intensity. Finally, the exposed photographic paper was photographically processed using a KreoniteTM Color Paper Processor.

The colorpatch print was scanned by an EpsonTM flatbed scanner at a resolution of 200 dpi to create a digital image. The code values of the digital image are directly related to the reflectances of red, blue, and green light by the print. These code values are converted to the CIELAB color system so that each pixel has an L*, a*, and b* value.

For each microdot that lies within a patch in the colorpatch print we calculate the average background color as follows: Consider a pixel x that contains a microdot and a number of neighboring pixels as shown below;

| | | | | |
|---|---|---|---|---|
| + | + | + | + | + |
| + | + | o | + | + |
| + | o | x | o | + |
| + | + | o | + | + |
| + | + | + | + | + | where o denotes a pixel that is influenced by the presence of a microdot, and + denotes a background pixel with a color that is not substantially influenced by the presence of the microdot. The background color (L*, a*, and b* values) assigned to the microdot containing pixel, is defined as the average color of the pixels denoted by the symbol +.

The color of a microdot as measured by the scanner is highly dependent on the color of the image that is coexistent with and surrounding the microdot. For this reason, using the colorpatch print we make a list of average background colors and the color of the pixel containing the microdot for each average background color. From this list we make a three-dimensional lookup table, 3D-LUT, that tells us what color we expect a microdot containing pixel to be for a wide range of background colors.

Careful measurement of the microdot spacing, in the digital image of the colorpatch print, reveals that the horizontal separation between microdots, Px, is 13.3521 pixels and the vertical separation, Py, is 13.2132 pixels. Refer to FIG. 1.

To demonstrate the detection of the microdots in a photographic print we printed a standardized portrait image recorded in color-negative film onto Eastman Kodak Professional Portra IIETM color photographic paper using the same enlarger as used for printing the color patch negative. The exposure time was 9.5 seconds at high intensity. The dichroic settings were 51.0 yellow, 47.5 magenta, and 0.0 cyan. The negative was enlarged 4.08× when printed to a size of 8"×10". The microdots were then exposed using the second enlarger as a point source of blue light with the same exposure conditions and Eastman Kodak Kodalith™ mask in the contact printing frame as previously described above. The exposed photographic paper was photographically processed using a Kreonite™ Color Paper Processor. The yellow microdots were not visually apparent. The portrait print was scanned by an Epson™ scanner at a resolution of 200 dpi to obtain a digital image.

The digital image is divided into 256×256 pixel sections and the average blue code value is calculated for each section. The section with the largest average blue code value is selected for further processing. We will refer to this section of the digital portrait image as the "best section digital image." The red, green, and blue code values of the best section digital image are converted into CIELAB values as described above. For each pixel in the best section digital image we calculate the average background L*, a*, and b* value as is also described above. (Note that this is done for all of the pixels in the image not just the ones that contain microdots. At this point, when the invention is practiced, we do not know which if any of the pixels in the image contain a microdot.) Using the 3D-LUT that was produced by an analysis of the colorpatch image and the average background color of each pixel we obtain the color that each pixel is expected to be if it contains a microdot.

Figure 7:
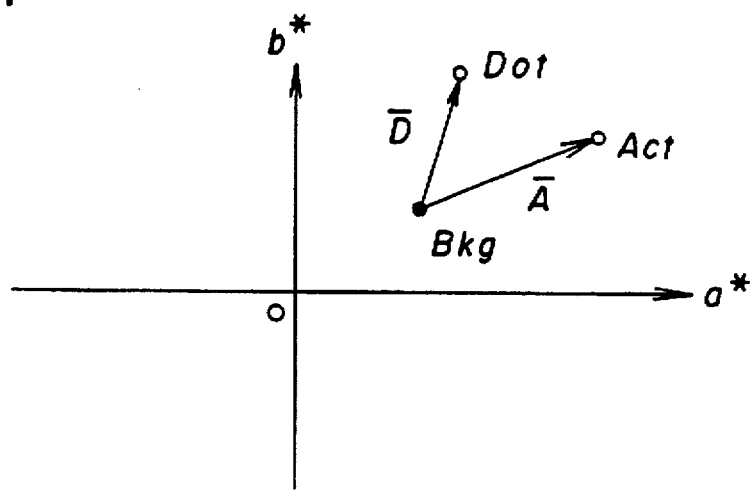
FIG. 7 is a vector plot useful in understanding the method of the invention.

We now define a quantity Y which is a measure of how close the color of a pixel is to the color expected for a pixel that contains a microdot. Referring to FIG. 7, a coordinate system is shown as a* values on the horizontal axis and b* values on the vertical axis. For any pixel we can define three points in this coordinate system. The average background color is located at coordinates (a*bkg b*bkg), the expected color for the pixel if it were to contain a microdot is located at (a*dot, b*dot) and finally the actual color of the pixel is (a*act, b*act). We now define two vectors. The first vector D points from (a*bkg, b*bkg) to (a*dot, b*dot). The second vector A points from (a*bkg, b*bkg) to (a*act, b*act). The quantity Y is defined by the relationship, $$Y = 2000 \, A * D \, k / |D|^2$$

where the * symbol indicates a vector dot product and vertical lines indicate magnitude. This equation has the property that if the pixel has the color expected for a pixel that contains a microdot based on the average background color of the pixel (A=D) the quantity Y will equal 2000. This holds true regardless of what the average background color happens to be. On the other hand, if the color of the pixel is the same as the average background color (A=O) the Y value will equal zero. This again is true regardless of the average background color.

The best section digital image is converted to an image in which each pixel is assigned a Y value. Ideally, this image should have code values of around 2000 at pixels which contain microdots and code values close to zero elsewhere. We refer to this image as the "Y image".

The Y image is the best section digital image processed so as to bring all microdot containing pixels to a uniform code value, namely 2000. The next step is to determine if features are present in the microdot image at the known horizontal and vertical period of the microdot array Px, and Py, respectively. In order to do this we calculate the Fourier transform of the microdot image and from this calculate the power spectrum of the image. The power spectrum is obtained by squaring the magnitude of the pixel values (which are in general complex numbers) of the Fourier transform. The power spectrum is a measure of the amount of content in the dot image at any horizontal frequency fx and any vertical frequency fy. Both fx and fy may vary between −127 and 128.

The microdots will cause peaks in the power in the power spectrum. If the print is placed on the scanner so that there is an angle θ between the horizontal direction of the print and the horizontal direction of the scanner then the peaks in the power spectrum will be at discrete horizontal frequencies, $$fx' = \cos\theta \, n \, 255 / Px + \sin\theta \, m \, 255 / Py$$

and discrete vertical frequencies, $$fy' = \cos\theta \, m \, 255 / Py - \sin\theta \, n \, 255 / Px$$

where n and m are all negative and positive integers consistent with the constraint that fx' and fy' must be in the range −127 to 128.

We calculate the "total power" by adding up terms in the power spectrum for all fx and fy, except for the DC term, i.e., for fx=fy=0. We then calculate the "dot power" by adding up terms in the power spectrum (except for the DC term) over all frequencies fx' and fy' given by the above equation. We must do this for values of θ between 0 and 180 degrees. The measure M that we use to determine if microdots are present in the Y image is, $$M(\theta) = 100 \, \text{Microdot Power}(\theta) / \text{Total Power}$$

If M is much larger than values typical of prints without microdots (not copy restricted), for some value of θ we conclude that the print is copy restricted.

For the portrait print we calculate a maximum value of M of 35.8 at θ equal to 0 degrees. Another print was made and scanned in exactly the same way as the portrait print except that microdots were not added to the print (not copy restricted). In this case the maximum value of M was 0.6 at a θ of 90 degrees.

Finally, the portrait print with microdots (copy restricted) was placed on the scanner at an angle. The horizontal direction of the print was not aligned with the horizontal direction of the scanner. In this case the maximum value of M was 32.8 at a θ of 11 degrees. We set a threshold of M at 10.0. If at some value of θ, the value of M is greater than 10, the print is not allowed to be copied; if M is less than 10, at all values of θ we allow the print to be copied. We see from this example that the copy restricted portrait print is not allowed to be copied. This is true regardless of how it is oriented when it is placed on the scanner. On the other hand, the non-copy restricted print is allowed to be copied.

Example 2

The next example is an implementation of the invention in a digital image. First, a digital image of 512 uniform color patches was made. In the series of patches, the red, green, and blue channels take on all combinations of the code values 0, 37, 63, 92, 127, 169, 214, and 255. In the center of each color patch a 2×2 pixel wide microdot was placed by setting the blue code value of the pixels in the microdot equal to zero. This digital image was printed on an Eastman Kodak Company Colorease™ thermal printer at a resolution of 300 dpi.

The print of the color patches was scanned at a resolution of 200 dpi by an Epson™ flatbed scanner. As described in the previous example, we make a 3D-LUT that tells us what color we expect a microdot to be for a wide range of background colors.

Next, an aperiodic arrangement of 2×2 pixel microdots was incorporated into a digital test image. As before, a microdot is incorporated by setting the blue code value of pixels in the microdot equal to zero and leaving the red and green code values unchanged. This digital image was printed on an Eastman Kodak Company Colorease™ thermal printer at a resolution of 300 dpi.

The yellow microdots were not perceptible. The print was then scanned at a resolution of 200 dpi by an Epson™ flatbed scanner.

The digital image of the scanned print containing an aperiodic arrangement of microdots was processed as described in Example 1 up to the point of creating the Y image. At this point, since in this example the microdot arrangement is aperiodic, it is not of use to calculate the power spectrum. Instead we threshold the Y image setting code values less than 1500 equal to zero and code values greater than or equal to 1500 equal to 255. This binary image has isolated 2×2 pixel or smaller regions of code value 255 separated by regions of code value zero. These isolated regions of code value 255 correspond to microdots in the print. From a count of these isolated regions we detect that the section of the digital image of the scanned print that was analyzed contained 142 microdots. Additionally, visual examination of the digital test image produced by the Eastman Kodak ColoreaseTm Thermal Printer was unable to detect the incorporated yellow microdots.

We consider the detection of one microdot as indicating that a print contains microdots and is therefore copy restricted. The print of the test digital image has been shown to be copy restricted by adding microdots to the digital image before it is printed. A print was also made of the test image without the microdots added (not copy restricted).

This print was scanned and processed in the same way as the microdot containing print. For this print, zero microdots were detected. Hence, the print was correctly found not to be copy restricted.

Example 3

A panel of 8 judges were asked to examine photographic prints that contained or did not contain yellow microdots. The judges were professional photographers and some were of notable fame in their profession. They were not compensated for performing the judging and were only told some of the prints contained a tagent that was being researched for copyright protection. The color-negative of Example 1 containing an image of a typical portrait scene was used to create 8"×10" prints on Eastman Kodak Professional Portra IIE™ color photographic paper using exactly the same enlarger settings as in Example 1. Prints containing yellow microdots were also made by giving the paper a second postexposure through a Kodalith™ mask in a contact printing frame using the second enlarger as a point source of blue light as before. A total of 5 Kodalith™ masks were made with an imagesetter as previously described. In addition to the previously mentioned mask containing transparent square microdots of 80 micron width separated by 1.6 mm, we also had four masks made with transparent square microdots of 60, 80, and 100 micron width and center-to-center spacings of 2.4 and 3.2 mm as shown in the following chart:

|  | Microdot Size (microns) | | |
| --- | --- | --- | --- |
| Spacing (mm) | 60 | 80 | 100 |
| 3.2 |  | E |  |
| 2.4 | B | C | D |
| 1.6 |  | A |  |

These masks were labeled A through E and the prints containing yellow microdots by exposure to these masks were given the same respective letter designation on the back of the prints. The print without microdots was labeled F on the back. The mask exposure time for the 60 micron microdots was 14 seconds, 7 seconds for the 80 micron microdots for all spacings, and 3.5 seconds for the 100 micron microdots.

The eight judges were asked individually to examine six groups of three images in each group and try to identify which print or prints were different. One or more in each set of three images contained a print with yellow microdots as a tagent. The photographers were provided with strong illumination from daylight fluorescent lamps and were free to manipulate the prints as they desired. None of the eight professional photographers found any difference between the three prints of each of the six groups and all photographers thought all prints were salable.

The photographic prints of a portrait to which dots were added with masks B, C, and D, were scanned with an Epson flatbed scanner at a resolution of 200 dpi. The digital image of each of the prints was processed as in example 1. The maximum M value (see example 1) was 23.1 at an angle of 0.2 degrees for the mask B print, 30.3 at an angle of −0.1 degrees for the mask C print, and 28.7 at an angle of −0.6 degrees for the mask D print. Setting the threshold of M at 10.0 as in example 1 we have detected that all three prints are copy restricted.

Example 4

A Zeta™ multi-pen graphics plotter was used to plot a hexagonal-packed array of yellow microdots on a piece of paper. The diameter of the microdots were about 0.2 mm, with a spacing to the nearest neighbor of 6.5 mm. The yellow ink from the pen soaked into the fibers of the paper. The paper was then inserted into the paper supply of a laser printer and text was printed onto the paper to produce a text document. The yellow microdots were not perceptible on the text document. A digital image of the text document was made using an Agfa Arcus Plus Scanner™. Examination of the blue channel of the digital image showed that the yellow microdots in areas free of toner are detectable.

Example 5

To a page of the tractor feed of the Zeta™ plotter was glued (Avery Glue SticTM) a paper currency with the front facing up. Yellow microdots were printed in a hex-packed array on the currency by the plotter as described above. After removal from the plotter, the microdots were not visually apparent. A digital image of the currency was made using an Agfa Arcus Plus Scanner™. Examination of the blue channel of the digital image showed that the yellow microdots are detectable.

Example 6

To a page of the tractor feed of the Zeta™ plotter was glued an 8"×10" sheet Eastman Kodak Professional Supra IIF™ color photographic paper processed to minimum density (white) with the emulsion side facing the paper of the tractor feed so that yellow microdots could be plotted in a hex-packed array onto the back resin-coated surface of the paper. The yellow microdots were about 0.22 mm in diameter with a spacing to the nearest neighbor of 6.5 mm. The microdots were not visible by casual observation and did not effect the white appearance of the front or back of the print.

The invention has been described with reference to preferred embodiments. However, it will be appreciated that variations and modifications can be effected by a person of ordinary skill in the art without departing from the scope of the invention.

PARTS LIST:

10 original document
12 image
14 window
16 microdots
20 copy print station
22 scanner
24 computer
26 keyboard
28 monitor
30 printer
32 encoded microdot
34 encoded microdot
36 encoded microdot
38 encoded microdot we claim:

1. A system for restricting the copying of an image document comprising:

an image of arbitrary and undetermined character formed in or on a document medium having a predetermined pattern of microdots creating an image document of arbitrary and undetermined character;

detecting means for detecting the presence of one or more microdots in said document ; and controlling means responsive to said detecting me ans for restricting a copy machine from copying the document when a microdot is detected.

2. The system according to claim 1 wherein said detecting means detects the presence of one or more microdots on the document based on one or more characteristics of color, color shift, optical density, size, shape, profile, orientation, geometrical arrangement, and spacing.

3. The system according to claim 1 wherein said microdots have a spectral character of low visual perceptibility.

4. The system according to claim 1 wherein the microdots are yellow.

5. The system according to claim 1 wherein the microdots are luminescent.

6. The system according to claim 1 wherein the equivalent circular diameter of the microdots is 300 microns or less with the edge of a microdot defined by the isodensity profile at which the optical density is half the maximum density.

7. The system according to claim 1 wherein the area of the microdot is subdivided into smaller areas of different colors, the color yellow occupying 50 % or more of the area.

8. The system according to claim 1 wherein the spatial arrangement of the microdots is periodic with one or more periodicities.

9. The system according to claim 1 wherein the spatial arrangement of the microdots is aperiodic with one or more aperiodicities.

10. The system according to claim 1 wherein the spatial arrangement of the microdots is a combination of periodic and aperiodic.

11. The system according to claim 1 wherein the microdots have an optical density, size, and spacing so as to not visually modify the lightness or color balance of the image in the document.

12. The system according to claim 1 wherein the microdots are embedded into or deposited onto at lease one surface of the document.

13. The system according to claim 1 wherein microdots embedded into the back side of a document to incorporate information about the manufacture and/or source of the document.

14. A method for restricting the copying of an image document comprising the steps of:
   forming an image of arbitrary and undetermined character in or on a document medium having a predetermined pattern of microdots thereby creating an image document of arbitrary and undetermined character;
   b) detecting the presence of at least one microdot on the image document when a copy action is attempted; and
   c) restrict ing the copy action when the at least one microdot is detected.

15. The method according to claim 14 wherein said microdots are selected to have a spectral character of low visual perceptibility.

16. The method according to claim 14 wherein the microdots are yellow.

17. The method according to claim 14 wherein the microdots are luminescent.

18. The method according to claim 14 wherein the equivalent circular diameter of the microdots is 300 microns or less with the edge of a microdot defined by the isodensity profile at which the optical density is half the maximum density.

19. A method according to claim 14 wherein the area of the microdot is subdivided into smaller areas of different colors, but with yellow occupying 50% or more of the area.

20. The method according to claim 14 wherein the spatial arrangement of the microdots is periodic with one or more periodicities.

21. The method according to claim 14 wherein the spatial arrangement of the microdots is aperiodic with one or more aperiodicities.

22. The method according to claim 14 wherein the spatial arrangement of the microdots is a combination of periodic and aperiodic.

23. The method according to claim 14 wherein the microdots are minimally spaced 0.5 mm center-tocenter.

24. The method of claim 14 wherein said microdots are embedded into or deposited onto at least one surface of the document.

25. The method of claim 14 wherein said microdots are embedded into the backside of a document to incorporate information about the manufacture and/or source of the document.

26. A method for controllably enabling the copying of an image document comprising the steps of:
   a) forming an image of arbitrary and undetermined character in or on a document medium havinga a predetermined pattern of microdots thereby creating an image document of arbitrary and undetermined character;
   b) detecting the presence of one or more microdots on the image document; and
   c) enabling or disabling the copying of the image document based on the detected presence of one or more microdots.

27. A method for controllably enabling the copying of a document comprising the steps of:
   a) embedding a plurality of microdots into a document;
   b) scanning the document to obtain document pixel values;
   c) defining a first metric that measures the closeness of document pixel values to predetermined microdot values;
   d) defining a second metric that measures the periodicity of the first metric;
   e) comparing the second metric to a predetermined value to determine the presence of microdots; and
   f) authorizing the copying based on the presence or the absence microdots.

28. A method for controllably enabling the copying of an image document comprising the steps of: a) forming an image of arbitrary and undetermined character in or on a document medium having a predetermined pattern of microdots thereby creating an image document of arbitrary and undetermined character;
   b) scanning the image document to obtain document pixel values;
   c) determining the closeness of document pixel values to predetermined microdot values;
   d) determining the presence or the absence of at least one microdot on the image document based on the measures of closeness from step c); and
   e) authorizing the copying based on the presence or the absence of the at least one microdot.

29. A method for controllably enabling the copying of an image document comprising the steps of:
   a) forming an image of arbitrary and undetermined character in or on a document medium having a predetermined pattern of microdots thereby creating an image document of arbitrary and undetermined character;
   b) detecting the presence of one or more microdots on the image document based on one or more characteristics of color, color shift, optical density, size, shape, profile, orientation, geometrical arrangement, and spacing; and
   c) enabling or disabling the copying of the image document based on the detected presence of one or more microdots.

30. A method for controllably enabling the copying of an image document comprising the steps of:

a) forming an image of arbitrary and undetermined character in or on a document medium having a predetermined pattern of microdots representing a signature thereby creating an image document of arbitrary and undetermined character;

b) detecting the presence of the microdot represented signature; and c) enabling or disabling the copying of the image document based on the detected presence of the represented signature.

31. A method for restricting the copying of an image document comprising:

a) an image of arbitrary and undetermined character formed in or on a document medium having a predetermined pattern of microdots thereby creating an image document of arbitrary and undetermined character;

b) scanning the image document to obtain document pixel values;

c) estimating the contribution of the unknown image to the color of a pixel in the image document based on the color of neighboring pixels;

d) determining the color that is expected for a microdot containing pixel based on the estimated color of the unknown image at that pixel location as determined in step c);

e) defining a metric related to the difference between the expected color of a microdot containing pixel as determined in step d) and the actual color of the pixel;

f) repeating steps c) through e) for each pixel location in the image; and g) restricting a copy action as a function of the metrics resulting from step f).

32. (New) The method according to claim 31 wherein step g) enables a copy action as a function of the metrics resulting from step f).

33. A method for restricting the copying of an image document comprising:

a) an image of arbitrary and undetermined character formed in or on a document medium having a predetermined periodic pattern of microdots thereby creating an image document of arbitrary and undetermined character;

b) scanning the image document to obtain document pixel values;

c) estimating the contribution of the unknown image to the color of a pixel in the image document based on the color of neighboring pixels;

d) determining the color that is expected for a microdot containing pixel based on the estimated color of the unknown image at that pixel location as determined in step c);

e) defining a metric related to the difference between the expected color of a microdot containing pixel as determined in step d) and the actual color of the pixel;

f) repeating steps c) through e) for each pixel location in the image to form a global metric; and g) defining a second metric related to the periodicity of the global metric; and h) restricting a copy action as a function of the second metric.

34. (New) A method for restricting the copying of an image document comprising:

a) an image of arbitrary and undetermined character formed in or on a document medium having a predetermined pattern of microdots thereby creating an image document of arbitrary and undetermined character;

b) scanning the image document to obtain document pixel values;

c) selecting a section of the arbitrary and unknown image in which the microdot pattern has a likelihood of being detectable;

d) estimating the contribution of the unknown image to the color of a pixel in the selected section based on the color of neighboring pixels;

e) determining the color that is expected for a microdot containing pixel based on the estimated color of the unknown image at that pixel location as determined in step d);

f) defining a metric related to the difference between the expected color of a microdot containing pixel as determined in step e) and the actual color of the pixel;

g) repeating steps c) through f) for each pixel location in the selected section; and h) restricting a copy action as a function of the metrics resulting from step g).

35. A method for restricting the copying of an image document comprising:

a) an image of arbitrary and undetermined character formed in or on a document medium having a predetermined periodic pattern of microdots thereby creating an image document of arbitrary and undetermined character;

b) scanning the image document to obtain document pixel values;

c) selecting a section of the arbitrary and unknown image in which the microdot pattern has a likelihood of being detectable;

d) estimating the contribution of the unknown image to the color of a pixel in the selected section based on the color of neighboring pixels;

e) determining the color that is expected for a microdot containing pixel based on the estimated color of the unknown image at that pixel location as determined in step d);

f) defining a metric related to the difference between the expected color of a microdot containing pixel as determined in step e) and the actual color of the pixel;

g) repeating steps d) through f) for each pixel location in the selected section to form a global metric;

h) defining a second metric related to the periodicity of the global metric; and i) restricting a copy action as a function of the second metric.

* * * * *